US005946068A

United States Patent [19]

Lee et al.

[11] Patent Number: 5,946,068

[45] Date of Patent: Aug. 31, 1999

[54] LIQUID CRYSTAL DISPLAY WITH DUMMY DATA DRIVING TO PRODUCE EDGE COLUMN COMPENSATION

[75] Inventors: Ju-Man Lee, Kyungki-do; Hyong-Gon Lee, Seoul; Sang-Chul Lee, Kyungki-do; Hyun-Sang Cho, Seoul; Seok-Tae Kim, Kyungki-do, all of Rep. of Korea

[73] Assignee: Samsung Electronics Co., Ltd., Rep. of Korea

[21] Appl. No.: 08/893,162

[22] Filed: Jul. 15, 1997

[30] Foreign Application Priority Data

Sep. 17, 1996 [KR] Rep. of Korea ...................... 96-40419

[51] Int. Cl.[6] ............................ G02F 1/1343; G09G 3/36

[52] U.S. Cl. .............................................. 349/143; 345/96

[58] Field of Search ................................ 349/143; 345/96

[56] References Cited

U.S. PATENT DOCUMENTS

| | | | |
|---|---|---|---|
| 5,093,655 | 3/1992 | Tanioka et al. | 345/96 |
| 5,285,301 | 2/1994 | Shirahashi et al. | 349/143 |
| 5,406,398 | 4/1995 | Suzuki et al. | 359/80 |
| 5,513,028 | 4/1996 | Sono et al. | 359/87 |
| 5,598,178 | 1/1997 | Kawamori | 345/96 |
| 5,745,090 | 4/1998 | Kim et al. | 349/39 |
| 5,790,092 | 8/1998 | Moriyama | 345/96 |
| 5,864,336 | 1/1999 | Yano | 345/211 |

*Primary Examiner*—William L. Sikes
*Assistant Examiner*—Kari M. Horney
*Attorney, Agent, or Firm*—Myers Bigel Sibley & Sajovec

[57] ABSTRACT

A liquid crystal display and method of operating the display includes an array of LCD elements arranged as a plurality of rows and a plurality of columns. A respective one of a plurality of data lines is connected to a respective column of LCD elements. A column of dummy LCD elements is disposed adjacent an outermost column of the array of LCD elements, and a dummy data line is connected to the dummy LCD elements of the column of dummy LCD elements. Preferably, a respective one of the plurality of data lines extends along a side of the column of LCD elements to which it is connected, between the column of LCD elements to which it is connected and an adjacent column of LCD elements, and the dummy data line extends along a side of the column of dummy LCD elements, between the column of dummy elements and the adjacent outermost column of the array of LCD elements. Data line driving means may be provided for driving a respective one of the plurality of data lines with a respective data signal having a respective polarity, a data signal driving a respective data line having a polarity which is inverted with respect to the polarity of a data signal driving an adjacent column of LCD elements. Dummy data line driving means may be provided for driving the dummy data line with a dummy data signal which has a polarity which is inverted with respect to the polarity of the data signal driving the data line connected to the outermost column of LCD elements. The column of dummy LCD elements may be obscured from a user of the LCD.

7 Claims, 4 Drawing Sheets

LIQUID CRYSTAL DISPLAY WITH DUMMY DATA DRIVING TO PRODUCE EDGE COLUMN COMPENSATION

FIELD OF THE INVENTION

The present invention relates to displays, more particularly, to liquid crystal displays (LCDs).

BACKGROUND OF THE INVENTION

Liquid crystal displays (LCDs) are commonly used as display devices for equipment such as portable televisions and notebook computers. A typical LCD includes a plurality of LCD elements forming a plurality of rows and columns, each LCD including a pixel electrode and a common electrode with a portion of liquid crystal material disposed therebetween. The pixel electrodes may be directly driven by a driver located outside of the array, or each pixel element may be coupled to an individual thin-film transistor (TFT) formed near the pixel location, the TFT including an electrode for receiving a data signal from a data line and an electrode for controlling application of the data signal to the pixel electrode. These elements may be driven according to a number of techniques, including line inversion and dot inversion.

According to a line inversion approach, the voltages applied across elements of adjacent rows of LCD elements are inverted with respect to one another. The image quality produced by line inversion techniques may be acceptable for smaller displays, but when the size and resolution of the display is increased, for example, when the resolution approaches that of an XGA mode (1024×768 pixels) for a display of diagonal measure greater than 12.1 inches, crosstalk between elements may cause the image quality to degrade to an unacceptable level.

Crosstalk can be reduced by using a dot inversion technique to drive the LCD elements. According to a typical dot inversion technique, the voltages applied across adjacent elements are inverted with respect to one another, as conceptually illustrated in FIG. 1. For a typical LCD in which elements are scanned by horizontal rows, dot inversion typically involves driving data lines connected to adjacent columns of LCD elements with voltages having opposite polarities with respect to a common voltage applied to the common electrodes of the LCD elements.

FIG. 2 illustrates a typical layout of a conventional TFT LCD. A plurality of LCD elements PX are formed on a substrate in an array of rows and columns. A plurality of data lines D1–Dk are formed, a respective one of which lies between a respective pair of columns of LCD elements PX. For the TFT LCD elements, a plurality of gate lines G1–Gn are provided for controlling the application of data signals to the LCD elements PX from the data lines D1–Dk, using a respective TFT incorporated in a respective LCD element PX.

While driving such an array using a dot inversion approach can improve image quality in comparison to line inversion approaches, capacitance between LCD elements of a column and adjacent data lines which are not connected to the column of LCD elements can cause distortion of the data signals applied to the LCD element of an array such as the one illustrated in FIG. 2. Although the uniform structure of the array generally causes the distortion to be uniform across most of the array, the lack of a data line adjacent an outermost column Cl of the array can cause nonuniform behavior in the outermost column of elements Cl. This nonuniform behavior can result in nonuniform image quality.

SUMMARY OF THE INVENTION

In light of the foregoing, it is an object of the present invention to provide liquid crystal displays (LCDs) which can provide more uniform image quality across columns of the LCD.

This and other objects, features and advantages are provided according to the present invention by LCDs which have a column of dummy LCD elements along an edge of an array of LCD elements, the column of dummy LCD being driven by a dummy data line. The dummy data line preferably is disposed between the column of dummy LCD elements and an adjacent column of the array of LCD elements, and is driven by a data voltage which has a polarity which is inverted with respect to the data line driving the adjacent outermost column of LCD elements. The array of LCD elements are viewable to a user of the LCD, while the column of dummy LCD elements preferably is obscured.

The presence of a column of dummy LCD elements can provide for greater uniformity in images displayed on the LCD. The additional column of LCD elements and the dummy data line can provide capacitive loading for the data line driving the outermost column of LCD elements, thus providing for more uniform impedance for the data lines driving the array of LCD elements.

In particular, according to the present invention, a liquid crystal display includes an array of LCD elements arranged as a plurality of rows and a plurality of columns. A respective one of a plurality of data lines is connected to a respective row of LCD elements. A column of dummy LCD elements is disposed adjacent an outermost column of the array of LCD elements, and a dummy data line is connected to the dummy LCD elements of the column of dummy LCD elements. Preferably, a respective one of the plurality of data lines extends along a side of the column of LCD elements to which it is connected, between the column of LCD elements to which it is connected and an adjacent column of LCD elements, and the dummy data line extends along a side of the column of dummy LCD elements, between the column of dummy elements and the adjacent outermost column of the array of LCD elements. Data line driving means may be provided for driving a respective one of the plurality of data lines with a respective data signal having a respective polarity which is inverted with respect to the polarity of a data signal driving an adjacent column of LCD elements. Dummy data line driving means may be provided for driving the dummy data line with a dummy data signal which has a polarity which is inverted with respect to the polarity of the data signal driving the data line connected to the outermost column of LCD elements. The column of dummy LCD elements may be obscured from a user of the LCD.

According to method aspects, a liquid crystal display including an array of LCD elements arranged as a plurality of rows and a plurality of columns and a plurality of data lines, a respective one of which is connected to a respective row of LCD elements, is operated by driving one data line connected to an outermost column of the plurality of columns of LCD elements with a dummy gate line signal. A data line connected to a column of LCD elements adjacent the outermost column of LCD elements may be driven with a data signal having a first polarity, and one data line connected to the outermost column of LCD elements may be driven with a dummy data signal which has a second polarity which is inverted with respect to the first polarity. The outermost column of LCD elements may be obscured.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF THE PREFERRED EMBODIMENTS

Figure 1:
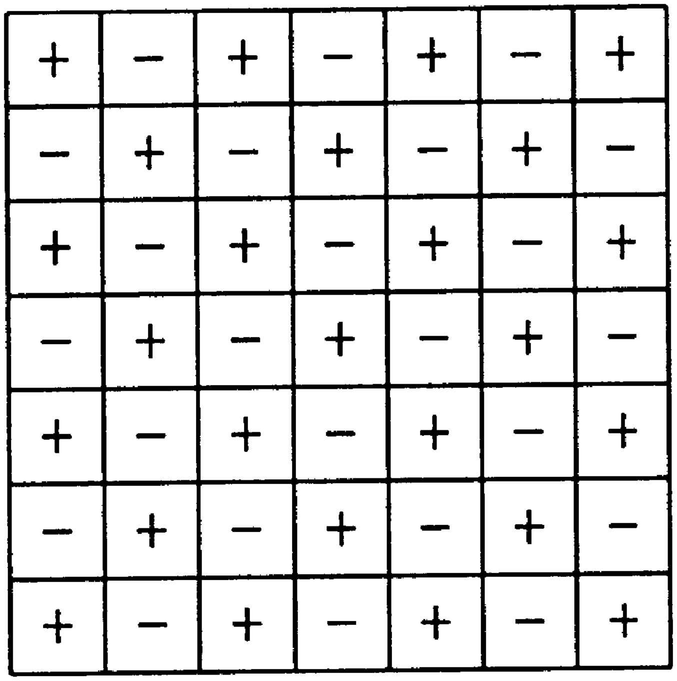
FIG. 1 (PRIOR ART)
FIG. 1 is a schematic diagram illustrating dot inversion according to the prior art.
Figure 2:
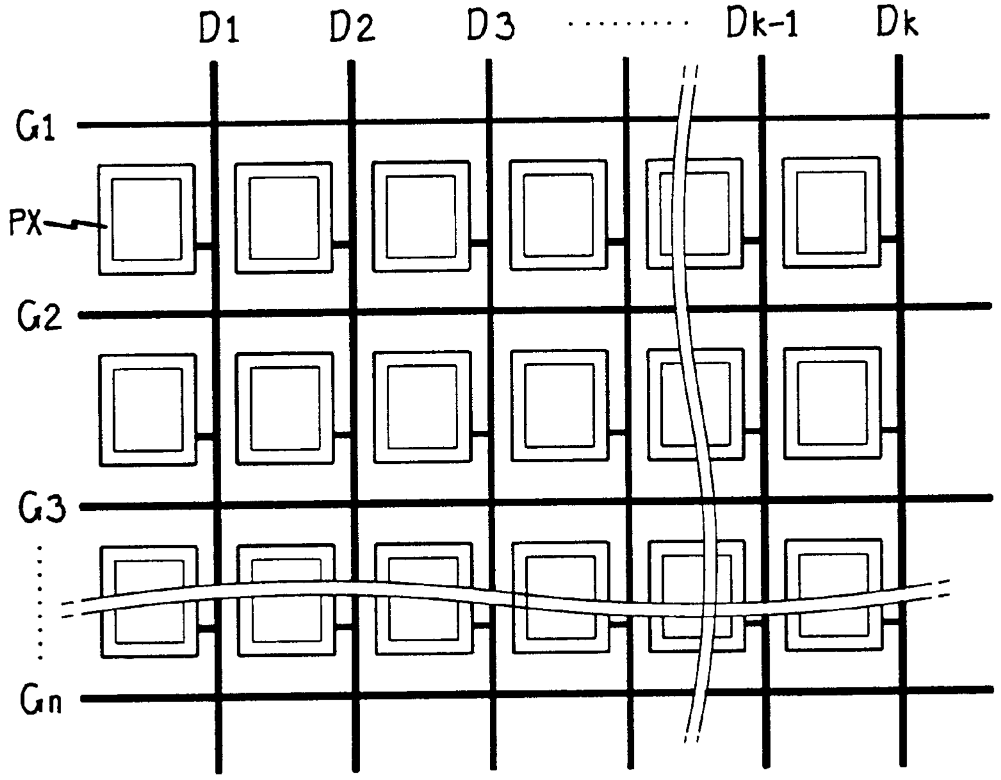
FIG. 2 (PRIOR ART)
FIG. 2 is a plan view illustrating an LCD panel according to the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 3:
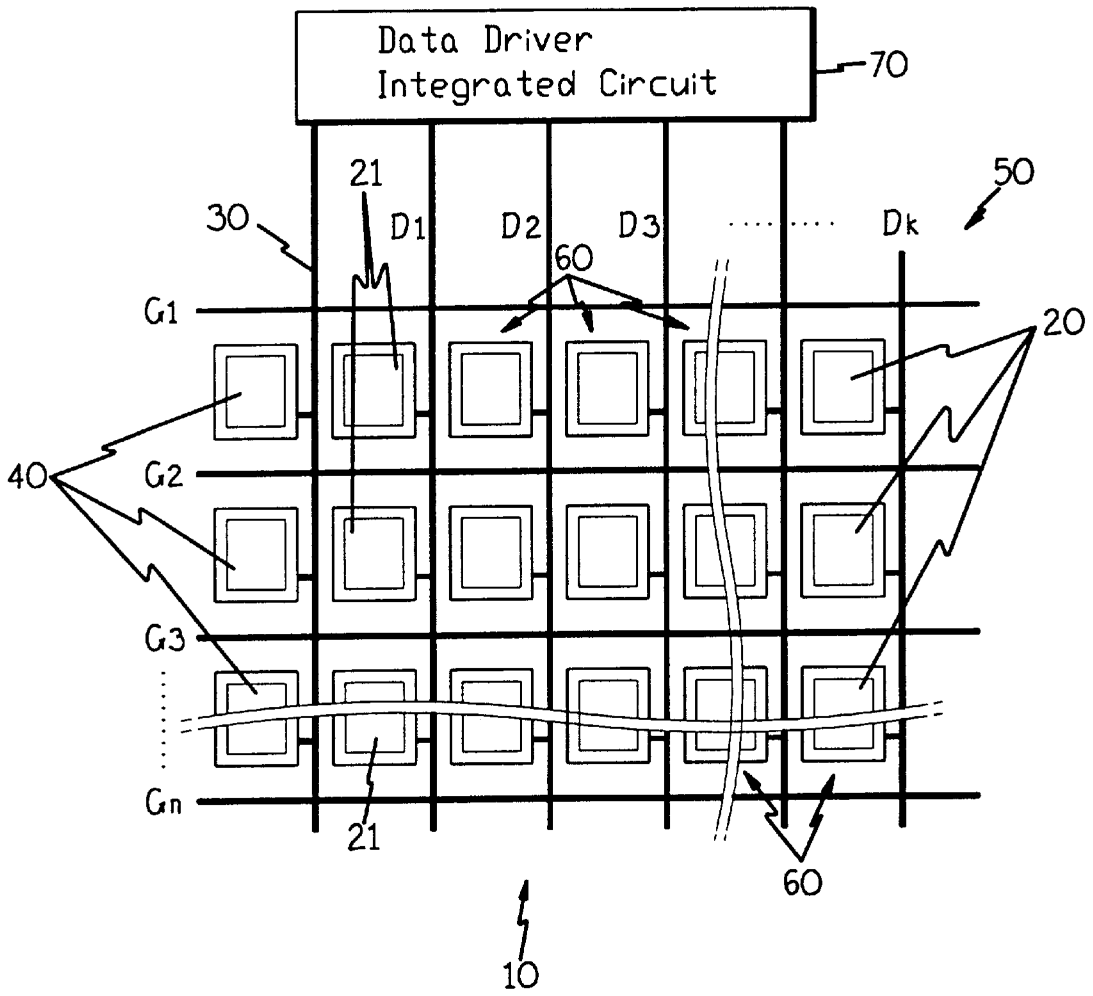
FIGS. 3 and 4 are plan views illustrating first and second embodiments of an LCD panel according to the present invention.

Referring to FIG. 3, a first embodiment of an LCD panel according to the present invention is illustrated. The LCD panel 50 includes a plurality of gate lines G1–Gn formed on a substrate 10. A plurality of data lines D1–Dk are formed on the substrate 10, transverse to the gate lines G1–Gn. An array of LCD elements 60 is arranged in rows and columns defined by the data lines D1–Dk and the gate lines G1–Gn, a respective one of the LCD elements 60 including a pixel electrode 20. In the embodiment illustrated, each pixel electrode 20 is connected to a data line D1–Dk on a “right” side of the pixel electrode 20. Those skilled in the art will appreciate that the connection of a pixel electrode to a data line may be direct, or may occur through a switching device which controls application of a data signal on the data line, e.g., a thin-film transistor (TFT).

Data line driving means, e.g., one or more data driver integrated circuits (ICs) 70, is provided for driving the data lines D1–Dk. Preferably, the driving means drives a respective one of the data lines D1–Dk with a respective data signal having a polarity, the data signal driving a respective data line having a polarity which is inverted with respect to the polarity of a data signal driving an adjacent column of the LCD elements, thereby providing for dot inversion operation of the LCD elements 60.

A column of dummy LCD elements 40 is positioned adjacent elements 21 of an outermost column on the left side of the array of LCD elements 60. A dummy data line 30 is disposed between the row of dummy LCD elements 40 and the elements 21 of the outermost row of the array. Dummy data line driving means, e.g., the data driver IC 70, drives the dummy data line 30 with a dummy data signal which has a polarity which is inverted with respect to the polarity of the data signal driving the data line connected to the LCD elements 21 of the outermost column of LCD elements of the array of LCD elements 60.

Figure 4:
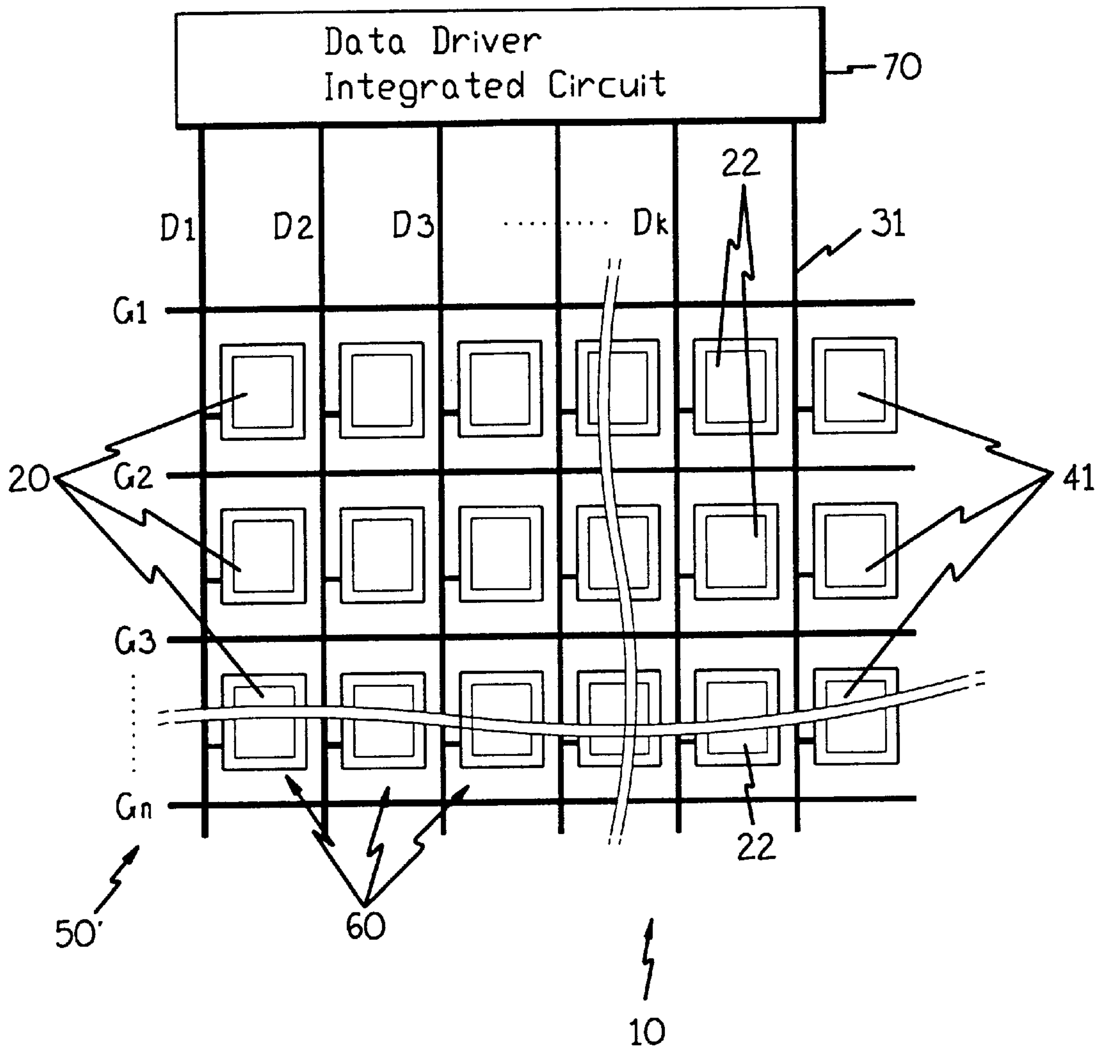

A “mirror image” of the embodiment illustrated in FIG. 3 is illustrated in FIG. 4. In the LCD panel 50' illustrated in FIG. 4, connections between the elements 60 of an array of LCD elements and data lines D1–Dk are made on the “left” side of the elements 60, and the data lines D1–Dk are driven as described with respect to FIG. 3. A column of dummy LCD elements 41 is positioned adjacent elements 22 of an outermost column on the right side of the array of LCD elements 60. A dummy data line 31 is disposed between the row of dummy LCD elements 41 and the elements 21 of the outermost row of the array. Dummy data line driving means, e.g., a data driver IC 70, drive the dummy data line 31 with a dummy data signal which has a polarity which is inverted with respect to the polarity of the data signal driving the data line connected to the LCD elements.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A liquid crystal display (LCD), comprising:

an array of LCD elements arranged as a plurality of rows and a plurality of columns;

a plurality of data lines, a respective one of which is connected to a respective column of LCD elements;

a column of dummy LCD elements adjacent an outermost column of said array of LCD elements;

a dummy data line connected to said dummy LCD elements of said column of dummy LCD elements;

data line driving means for driving a respective one of said plurality of data lines with a respective data signal having a respective polarity which is inverted with respect to the polarity of a data signal driving an adjacent column of LCD elements; and dummy data line driving means for driving said dummy data line with a dummy data signal which has a polarity which is inverted with respect to the polarity of the data signal driving said data line connected to said outermost column of LCD elements.

2. An LCD according to claim 1:

wherein a respective one of said plurality of data lines extends along a side of said column of LCD elements to which it is connected, between said column of LCD elements to which it is connected and an adjacent column of LCD elements; and wherein said dummy data line extends along a side of said column of dummy LCD elements, between said column of dummy elements and said adjacent outermost column of said array of LCD elements.

3. An LCD according to claim 1, wherein said array of LCD elements is viewable by a user of the LCD, and wherein said column of dummy LCD elements is obscured from a user of the LCD.

4. A liquid crystal display (LCD), comprising:

an array of LCD elements arranged as a plurality of rows and a plurality of columns;

a plurality of data lines, a respective one of which is connected to a respective column of LCD elements;

data line driving means for driving a data line connected to a column of LCD elements adjacent an outermost column of LCD elements with a data signal having a first polarity; and dummy data line driving means for driving a data line connected to said outermost column of LCD elements with a dummy data signal which has a second polarity which is inverted with respect to said first polarity, wherein said outermost column of LCD elements is obscured.

5. An LCD according to claim 4, wherein a respective one of said plurality of data lines extends along a side of said column of LCD elements to which it is connected, between said column of LCD elements to which it is connected and an adjacent column of LCD elements.

6. A method of operating a liquid crystal display including an array of LCD elements arranged as a plurality of rows and a plurality of columns and a plurality of data lines, a respective one of which is connected to a respective column of LCD elements, the method comprising the steps of:

driving a data line connected to a column of LCD elements adjacent an outermost column of LCD elements with a data signal having a first polarity; and driving a dummy data line connected to the outermost column of the plurality of columns of LCD elements with a dummy data signal which has a second polarity which is inverted with respect to the first polarity.

7. A method according to claim 6, further comprising the step of obscuring the outermost column of LCD elements.

* * * * *